(12) United States Patent
Wariishi et al.

(10) Patent No.: US 6,524,735 B1
(45) Date of Patent: Feb. 25, 2003

(54) FUEL CELL STACK WITH A CURVED FLOW GUIDE SECTION

(75) Inventors: Yoshinori Wariishi, Utsunomiya (JP); Masaharu Suzuki, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,248

(22) Filed: May 17, 2000

(30) Foreign Application Priority Data

May 18, 1999  (JP) .......................................... 11-137869

(51) Int. Cl.[7] .............................................. H01M 8/04
(52) U.S. Cl. ............................ 429/39; 429/34; 429/38
(58) Field of Search ............................ 429/34, 13, 26, 429/38, 39

(56) References Cited

U.S. PATENT DOCUMENTS

| | | | | |
|---|---|---|---|---|
| 4,612,261 A | * | 9/1986 | Tsukui | 429/13 |
| 5,547,776 A | * | 8/1996 | Fletcher | 429/13 |
| 6,329,094 B1 | * | 12/2001 | Yasuo | 429/34 |

FOREIGN PATENT DOCUMENTS

| | | | | |
|---|---|---|---|---|
| JP | 4-308665 | * | 10/1992 | ............ H01M/8/24 |
| JP | 08213044 A | | 8/1996 | |
| JP | 09055216 A | | 2/1997 | |
| JP | 09293524 A | | 11/1997 | |
| JP | 10199552 A | | 7/1998 | |
| JP | 2000-331691 | * | 11/2000 | ............ H01M/8/02 |

* cited by examiner

*Primary Examiner*—Patrick Ryan
*Assistant Examiner*—Mark Ruthkosky
(74) *Attorney, Agent, or Firm*—Lahive & Cockfield, LLP (57) ABSTRACT

A fuel cell stack comprises a fuel gas supply passage and a fuel gas discharge passage for allowing a fuel gas to flow therethrough, penetrating through first and second separators. A fuel gas flow passage for supplying the fuel gas to each of fuel cell units is provided on a surface of the first separator. Curved surfaces, which are curved in a flow direction of the fuel gas, are provided corresponding to each of boundary portions between the fuel gas flow passage and the fuel gas supply passage and the fuel gas discharge passage. Accordingly, it is possible to effectively reduce the delivery pressure loss and the collection pressure loss of the fuel gas.

9 Claims, 11 Drawing Sheets

FUEL CELL STACK WITH A CURVED FLOW GUIDE SECTION

BACKGROUND OF THE INVENTION

1. Field of the Invention

The present invention relates to a fuel cell stack comprising a plurality of fuel cell units each composed of an electrolyte interposed between an anode electrode and a cathode electrode, the plurality of fuel cell units being stacked with a plurality of separators intervening therebetween.

2. Description of the Related Art

For example, the solid polymer type fuel cell comprises a fuel cell unit including an anode electrode and a cathode electrode disposed opposingly on both sides of an electrolyte composed of a polymer ion exchange membrane (cation exchange membrane), the fuel cell unit being interposed between separators. Usually, the solid polymer type fuel cell is used as a fuel cell stack comprising a predetermined number of the fuel cell units and a predetermined number of the separators which are stacked with each other.

In such a fuel cell, a fuel gas such as a gas principally containing hydrogen (hereinafter referred to as "hydrogen-containing gas"), which is supplied to the anode electrode, is converted into hydrogen ion on the catalyst electrode, and the ion is moved toward the cathode electrode via the electrolyte which is appropriately humidified. The electron, which is generated during this process, is extracted for an external circuit, and the electron is utilized as DC electric energy. An oxygen-containing gas such as a gas principally containing oxygen (hereinafter referred to as "oxygen-containing gas") or air is supplied to the cathode electrode. Therefore, the hydrogen ion, the electron, and the oxygen gas are reacted with each other on the cathode electrode, and thus water is produced.

In order to supply the fuel gas, the oxygen-containing gas, and the cooling medium to the respective fuel cell units, the fuel cell stack usually adopts an internal manifold which is incorporated into the inside of the fuel cell stack, or an external manifold which is externally attached to the fuel cell stack. Such a manifold is arranged corresponding to the upper and lower sides or the right and left sides of the respective fuel cell units. When the fluid such as the fuel gas, the oxygen-containing gas, or the cooling medium is supplied to a supply passage from one end side in the stacking direction of the stack, then the fluid is supplied to each of the fuel cell units via respective branch passages, and then the fluid is merged into a discharge passage to be discharged to the one end side or the other end side in the stacking direction of the stack.

Figure 12:
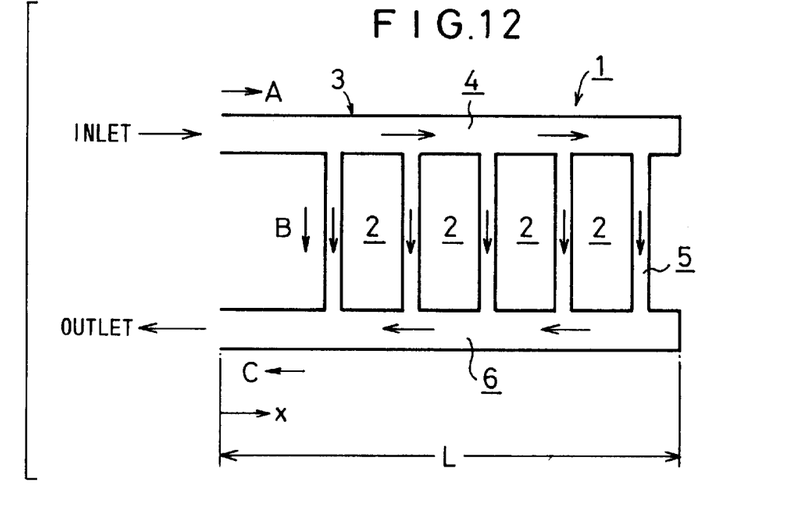
FIG. 12 illustrates the flow passages of the counter flow type of the fuel cell stack concerning the conventional technique.

Specifically, as shown in FIG. 12, the constitutive elements of a fuel cell-stack 1 are classified into fuel cell units 2 and a flow passage 3 of the counter flow type for delivering and supplying the fluid to the respective fuel cell units 2. The flow passage 3 comprises a delivery tube 4 provided integrally with the manifold, branch tubes 5 for supplying the fluid in the direction of the arrow B perpendicular to the flow direction (direction of the arrow A) of the delivery tube 4, and a collective tube 6 for discharging the fluid merged from the respective branch tubes 5 in the direction of the arrow C which is opposite to the direction of the arrow A.

Figure 13:
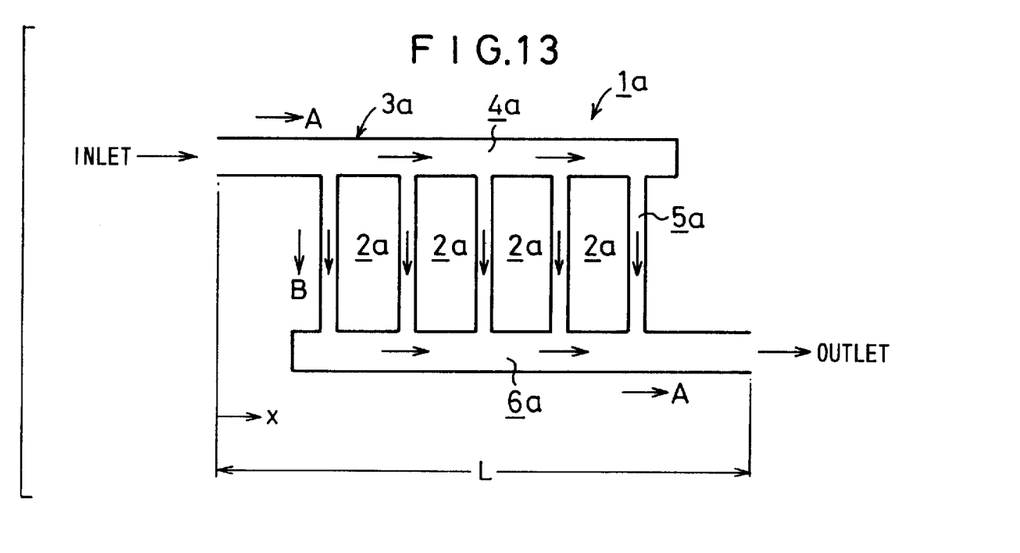
FIG. 13 illustrates the flow passages of the parallel flow type of the fuel cell stack concerning the conventional technique.

On the other hand, a fuel cell stack 1a shown in FIG. 13 is classified into fuel cell units 2a and a flow passage 3a of the parallel flow type. The flow passage 3a comprises a delivery tube 4a for supplying the fluid in the direction of the arrow A, branch tubes 5a for supplying the fluid along the respective fuel cell units 2a, and a collective tube 6a for discharging the fluid merged from the respective branch tubes 5a in the direction of the arrow A.

Figure 14:
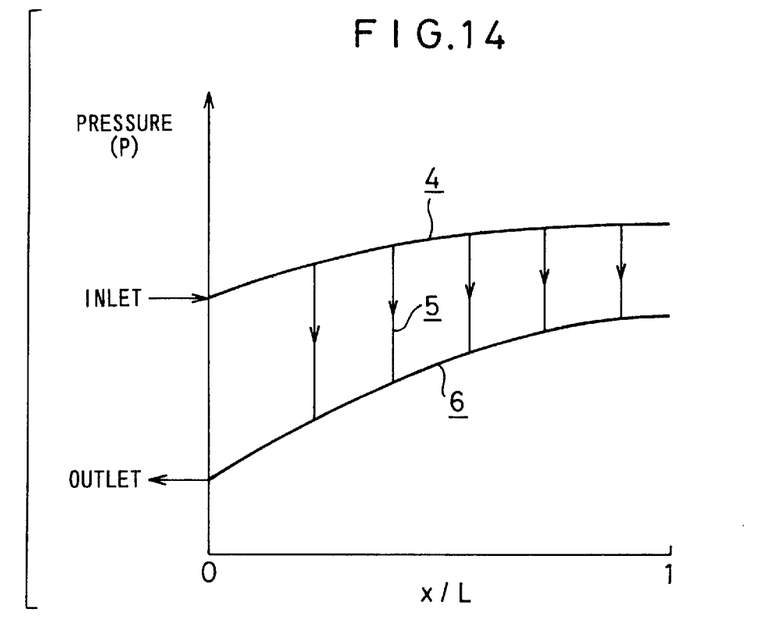
FIG. 14 illustrates the pressure distribution in the flow passages of the counter flow type.

However, in the case of the flow passage 3 of the counter flow type shown in FIG. 12, the boundary portion between the delivery tube 4 and the branch tube 5 constitutes a communication passage which is formed to be at the right angle. As a result, the branch loss of the fluid pressure is large. Further, each of the branch tubes 5 communicates with the collective tube 6 via a communication passage which is formed to be at the right angle. Therefore, the merging loss of the fluid pressure is also large. FIG. 14 shows the difference between the inlet pressure of the delivery tube 4 and the outlet pressure of the collective tube 6, i.e., the difference in pressure concerning the branch tube 5. Therefore, such a problem is pointed out that the pressure loss in the flow passage 3 is considerably increased, and the fluid is unevenly supplied to the respective fuel cell units 2.

Figure 15:
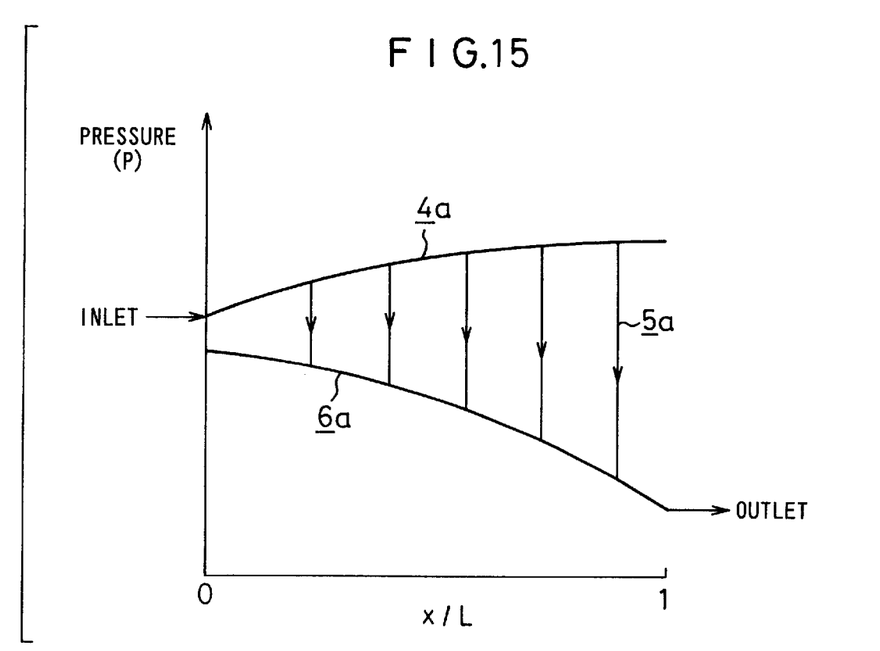
FIG. 15 illustrates the pressure distribution in the flow passages of the parallel flow type.

On the other hand, in the case of the flow passage 3a of the parallel flow type shown in FIG. 13, the outlet side pressure of the collective tube 6a is considerably lowered as compared with the inlet side pressure of the delivery tube 4a. Therefore, as shown in FIG. 15, the pressure loss in the flow passage 3a is considerably increased.

In view of the above, for example, as disclosed in Japanese Laid-Open Patent Publication No. 8-213044, a fuel cell is known, which is provided with a fuel flow-adjusting member formed to have a predetermined thickness by a porous member for permeating the fuel, arranged at an inflow port provided with a gap, in a delivery passage having the inflow port for the fuel for delivering the fuel flowing from the inflow port to a plurality of cells. However, in the case of the conventional technique described above, the following problem is pointed out. That is, although the fuel flow-adjusting member adjusts the flow of the fuel in the delivery passage, the pressure loss of the entire system is increased due to the fuel flow-adjusting member, and the power generation efficiency is lowered.

SUMMARY OF THE INVENTION

A principal object of the present invention is to provide a fuel cell stack which makes it possible to effectively reduce the pressure loss in a flow passage, and deliver a fluid uniformly and smoothly to respective fuel cell units with a simple structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
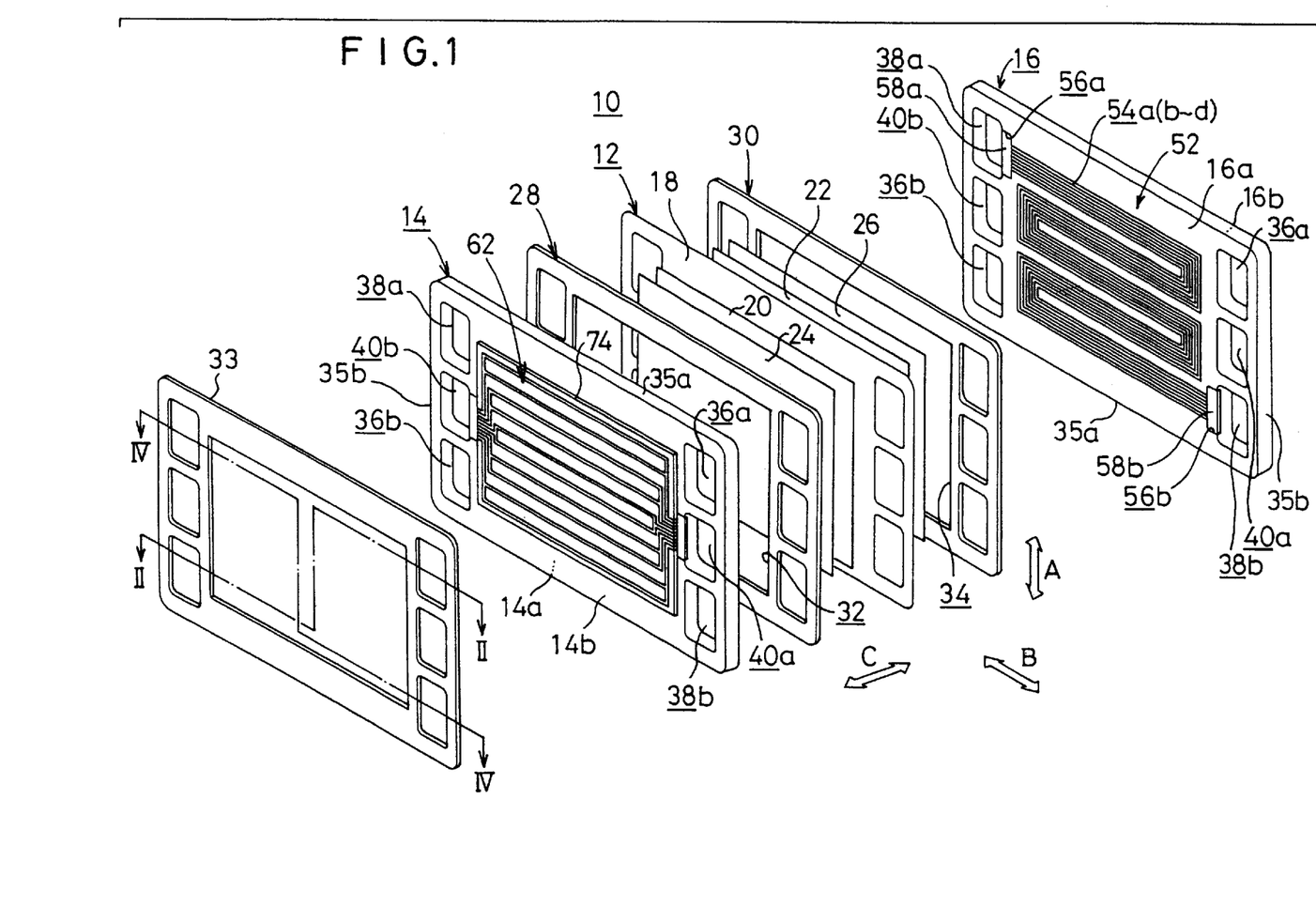
FIG. 1 shows an exploded perspective view illustrating major components of a fuel cell stack according to a first embodiment of the present invention.
Figure 2:
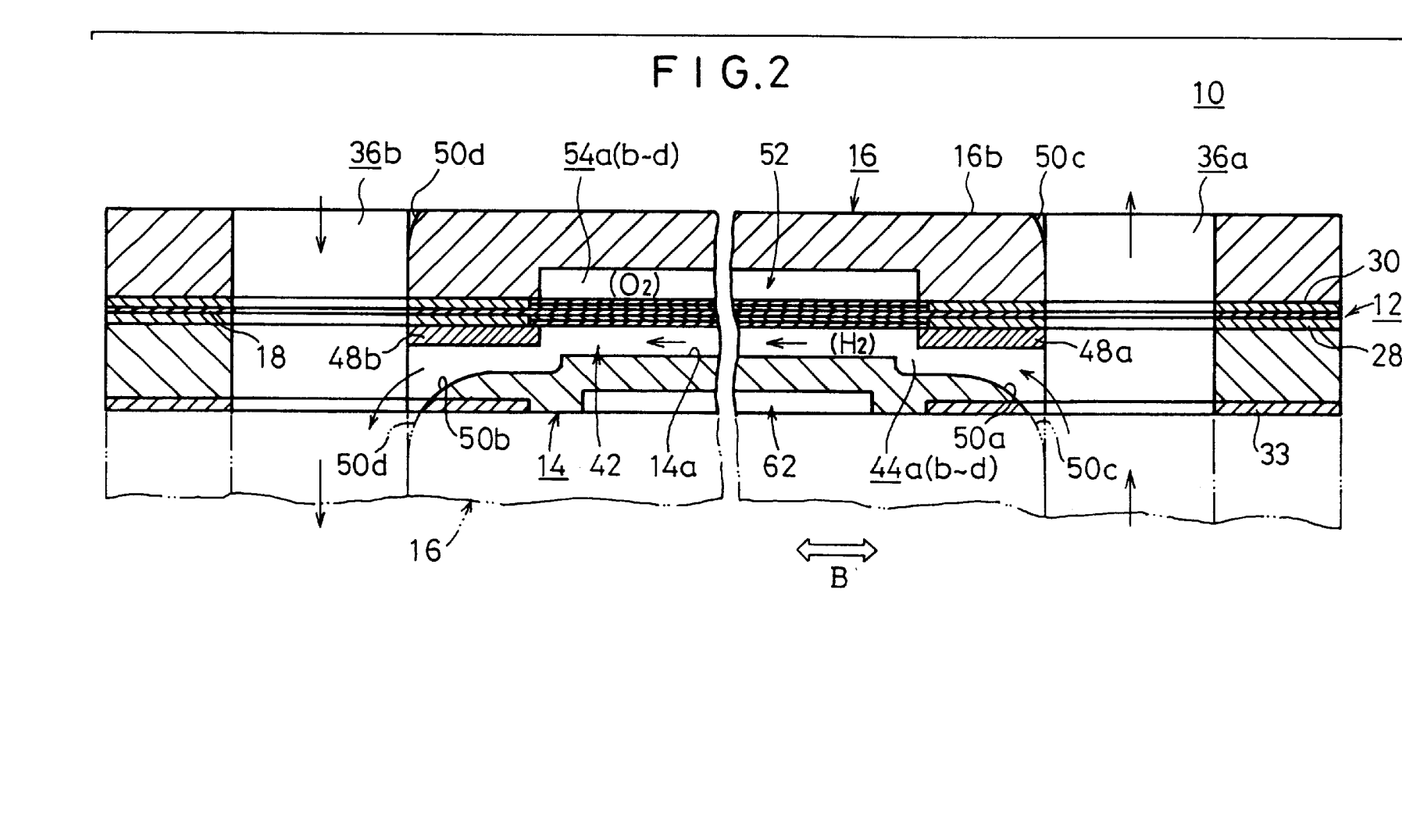
FIG. 2 shows a sectional view illustrating the fuel cell stack taken along a line II—II shown in FIG. 1.

FIG. 1 shows an exploded perspective view illustrating major components of a fuel cell stack 10 according to a first embodiment of the present invention, and FIG. 2 shows a sectional view illustrating the fuel cell stack 10 taken along a line II—II shown in FIG. 1.

The fuel cell stack 10 comprises a fuel cell unit 12, and first and second separators 14, 16 for supporting the fuel cell unit 12 interposed therebetween. A plurality of sets of these components are stacked with each other. The fuel cell stack 10 has a rectangular parallelepiped-shaped configuration as a whole. For example, the fuel cell stack 10 is arranged such that the short side direction (direction of the arrow A) is directed in the direction of the gravity, and the long side direction (direction of the arrow B) is directed in the horizontal direction.

The fuel cell unit 12 includes a solid polymer ion exchange membrane 18, and an anode electrode 20 and a cathode electrode 22 which are arranged with the ion exchange membrane 18 intervening therebetween. First and second gas diffusion layers 24, 26, each of which is composed of, for example, porous carbon paper as a porous layer, are arranged for the anode electrode 20 and the cathode electrode 22.

First and second gaskets 28, 30 are provided on both sides of the fuel cell unit 12. The first gasket 28 has a large opening 32 for accommodating the anode electrode 20 and the first gas diffusion layer 24. The second gasket 30 has a large opening 34 for accommodating the cathode electrode 22 and the second gas diffusion layer 26. The fuel cell unit 12 and the first and second gaskets 28, 30 are interposed between the first and second separators 14, 16. A seal member 33 is interposed between the mutually adjoining first and second separators 14, 16.

Figure 3:
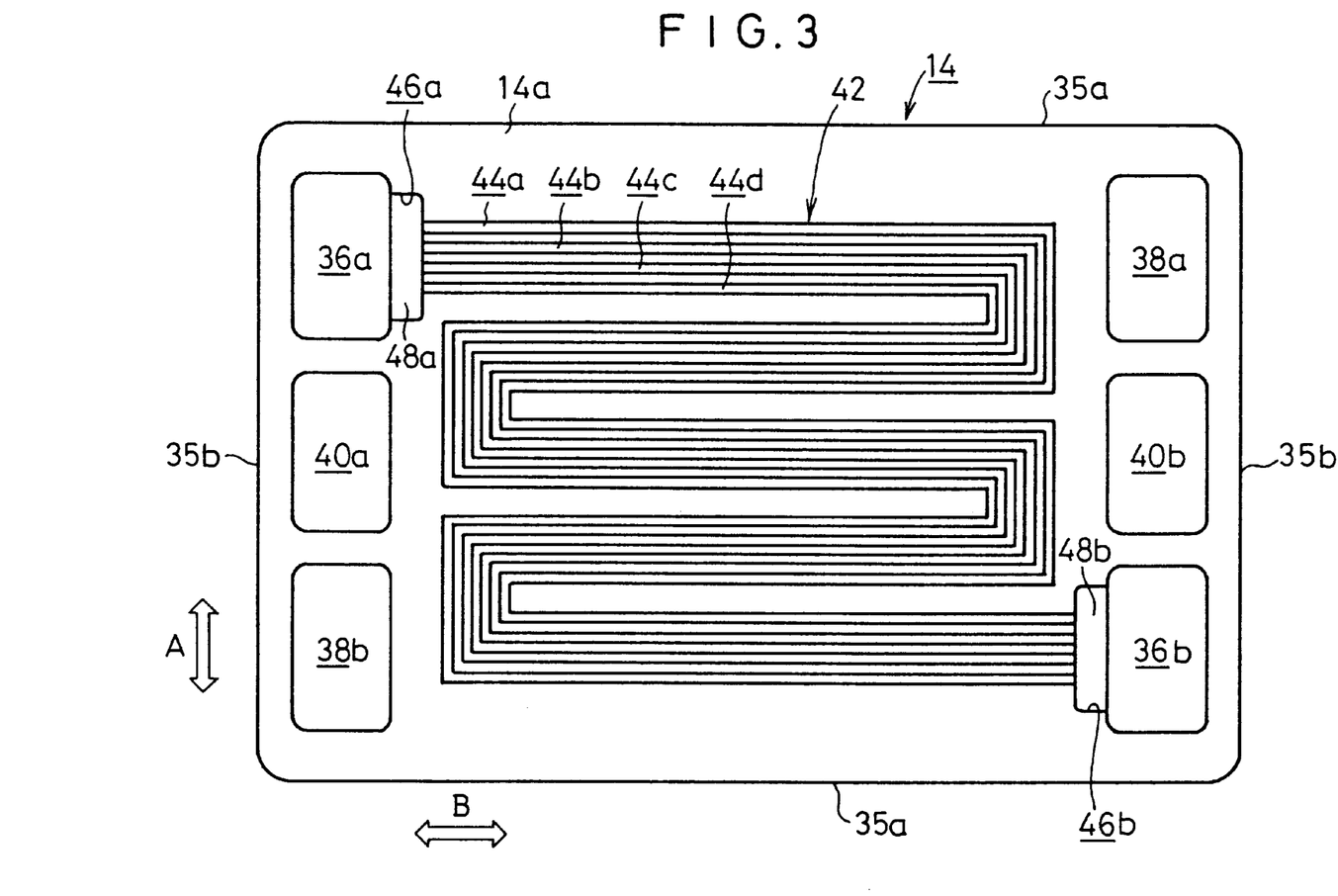
FIG. 3 shows a front view illustrating a first surface of a first separator for constructing the fuel cell stack.

As shown in FIGS. 1 and 3, the first separator 14 is designed such that each of the surface 14a opposed to the anode electrode 20 and the surface 14b disposed on the opposite side has a rectangular configuration. The second separator 16 is designed such that each of the surface 16a opposed to the cathode electrode 22 and the surface 16b disposed on the opposite side has a rectangular configuration. For example, the first and second separators 14, 16 are arranged such that the long side 35a is directed in the horizontal direction, and the short side 35b is directed in the direction of the gravity. The ratio of the long side 35a to the short side 35b is set, for example, to be about 1.5 to 3:1.

An internal manifold, which is used to make the flow of a fuel gas such as a hydrogen-containing gas, an oxygen-containing gas such as air or a gas containing oxygen, and a cooling medium such as pure water, ethylene glycol, and oil, is formed in the fuel cell stack 10 comprising a plurality of stacked sets, each of the sets comprising the fuel cell unit 12 and the first and second separators 14, 16.

Specifically, as shown in FIG. 1, a fuel gas supply passage (communication passage) 36a for making the flow of the fuel gas, and an oxygen-containing gas supply passage (communication passage) 38a for making the flow of the oxygen-containing gas are provided in the stacking direction (direction of the arrow C) of the fuel cell stack 10, on upper sides of both end edge portions on the short side 35b of each of the first and second separators 14, 16.

A cooling medium supply passage (communication passage) 40a and a cooling medium discharge passage (communication passage) 40b for making the flow of the cooling medium are provided on central sides of both end edge portions on the short side 35b of each of the first and second separators 14, 16. A fuel gas discharge passage (communication passage) 36b and an oxygen-containing gas discharge passage (communication passage) 38b are provided at diagonal positions with respect to the fuel gas supply passage 36a and the oxygen-containing gas supply passage 38b respectively, on lower sides of both end edge portions on the short side 35b of each of the first and second separators 14, 16.

As shown in FIG. 3, a fuel gas flow passage 42 communicating with the fuel gas supply passage 36a and the fuel gas discharge passage 36b are formed on the surface 14a of the first separator 14. The fuel gas flow passage 42 includes a plurality of, for example, four gas flow passage grooves 44a to 44d. First ends of the gas flow passage grooves 44a to 44d communicate with the fuel gas flow passage 36a. In the surface 14a, the gas flow passage grooves 44a to 44d extend in the horizontal direction (direction of the arrow B), and then they are bent and meandered in the downward direction (direction of the arrow A). Second ends of them communicate with the fuel gas discharge passage 36b.

Grooves 46a, 46b, which are disposed closely to the fuel gas flow passage 36a and the fuel gas discharge passage 36b respectively, are formed on the surface 14a of the first separator 14. The grooves 46a, 46b cover the gas flow passage grooves 44a to 44d, and they are formed to be shallow as compared with the gas flow passage grooves 44a to 44d. Lid members 48a, 48b are arranged for the grooves 46a, 46b. The surfaces of the lid members 48a, 48b are flushed with the surface 14a of the separator 14.

As shown in FIG. 2, a curved surface (guide section) 50a, which is curved along the flow direction of the fuel gas, is formed on the surface 14a of the first separator 14, corresponding to the portion of introduction of the fuel gas from the fuel gas supply passage 36a into the gas flow passage grooves 44a to 44d. A curved surface (guide section) 50b, which is curved along the flow direction of the fuel gas which is not used, is formed on the surface 14a, corresponding to the portion of introduction from the gas flow passage grooves 44a to 44d into the fuel gas discharge passage 36b.

The curved surfaces 50a, 50b are provided to be directed toward the second separator 16. Curved surfaces (guide sections) 50c, 50d, which are curved toward the surface 16b from the inner walls of the fuel gas supply passage 36a and the fuel gas discharge passage 36b and which are continuous to the curved surfaces 50a, 50b, are formed on the surface 16b of the second separator 16.

The curvature of each of the curved surfaces 50a to 50d is set to be within such a range that the pressure loss is successfully mitigated. Other curved surfaces described below are constructed in the same manner as described above.

As shown in FIG. 1, an oxygen-containing gas flow passage 52, which makes communication between the oxygen-containing gas supply passage 38a and the oxygen-containing gas discharge passage 38b, is formed on the surface 16a of the second separator 16. The oxygen-containing gas flow passage 52 includes a plurality of, for example, four gas flow passage grooves 54a to 54d. The gas flow passage grooves 54a to 54d are formed along the surface 16a of the separator 16 while meandering in the horizontal direction (direction of the arrow B). Grooves 56a, 56b, which are disposed closely to the oxygen-containing gas supply passage 38a and the oxygen-containing gas discharge passage 38b respectively, are formed on the surface 16a. Lid members 58a, 58b are arranged for the grooves 56a, 56b.

Figure 4:
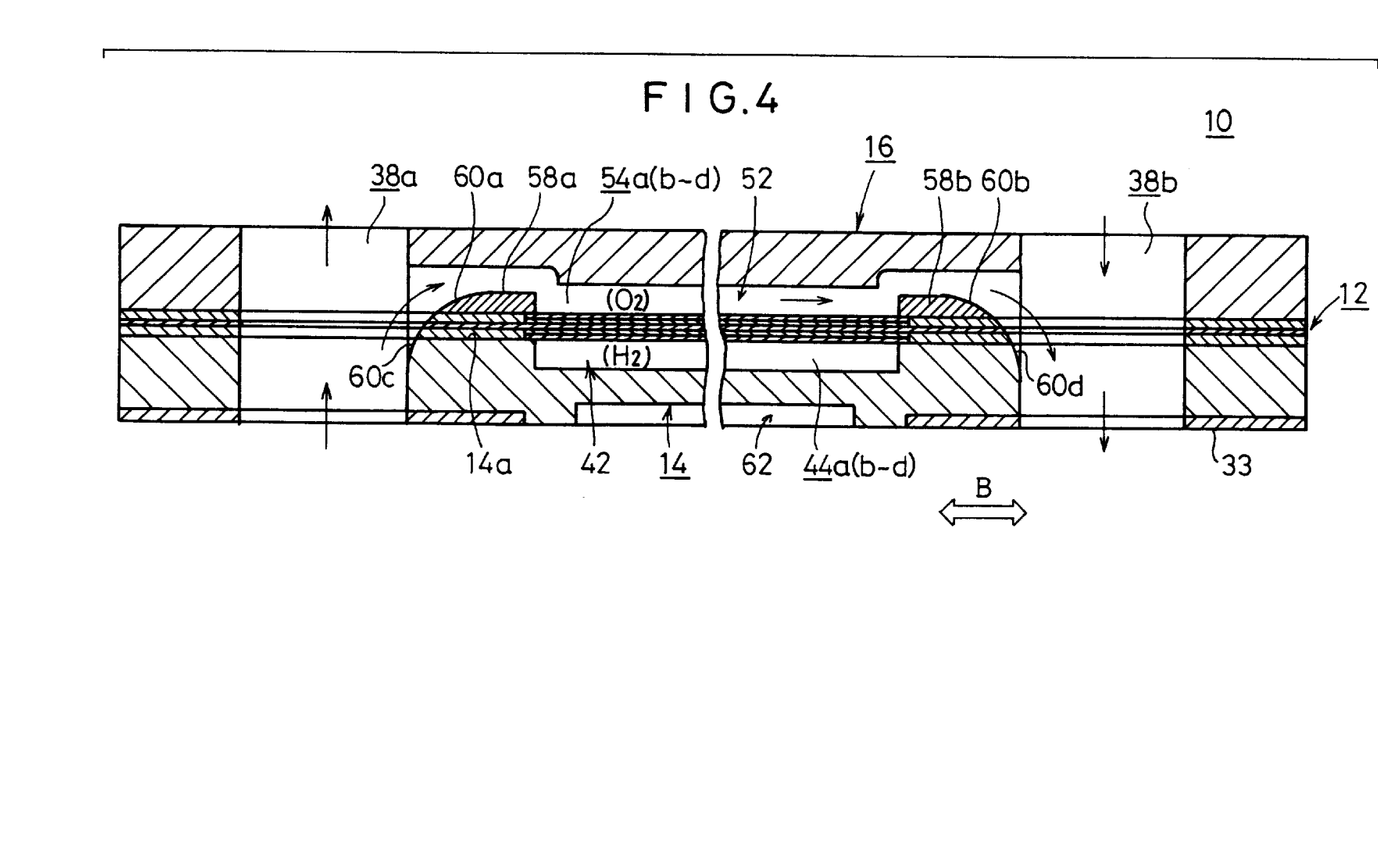
FIG. 4 shows a sectional view illustrating the fuel cell stack taken along a line IV—IV shown in FIG. 1.

As shown in FIG. 4, a curved surface (guide section) 60a, which is curved along the flow direction of the oxygen-containing gas, is formed on the lid member 58a, corresponding to the portion of introduction of the oxygen-containing gas from the oxygen-containing gas supply passage 38a into the gas flow passage grooves 54a to 54d. A curved surface (guide section) 60b, which is curved along the flow direction of the oxygen-containing gas, is formed on the lid member 58b, corresponding to the portion of introduction of the oxygen-containing gas which is not used, from the gas flow passage grooves 54a to 54d into the oxygen-containing gas discharge passage 38b. The curved surfaces 60a, 60b are continuous to curved surfaces (guide sections) 60c, 60d which are formed corresponding to entrance portions of the oxygen-containing gas supply passage 38a and the oxygen-containing gas discharge passage 38b on the side of the surface 14a of the first separator 14.

Figure 5:
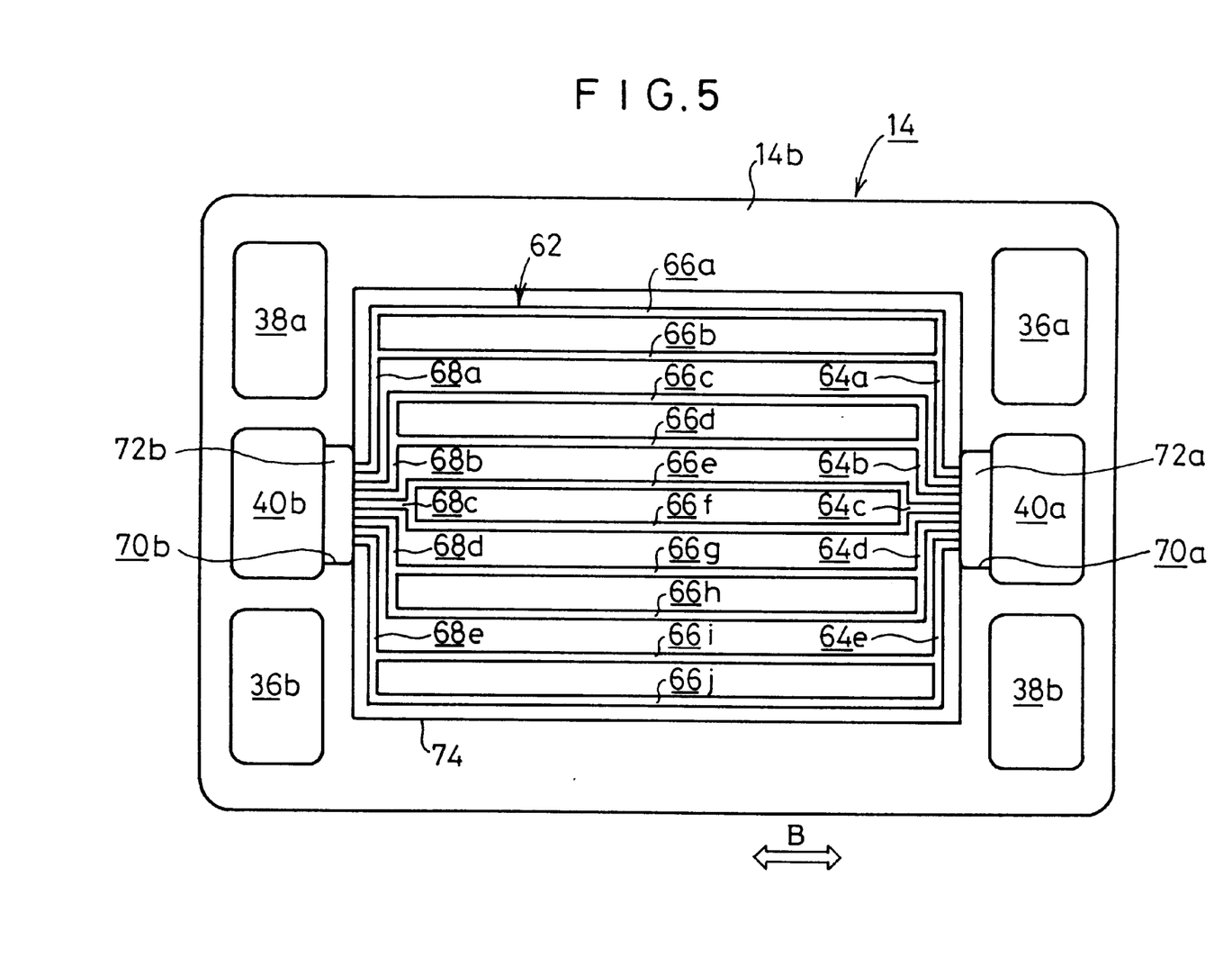
FIG. 5 shows a front view illustrating a second surface of the first separator.

As shown in FIGS. 1 and 5, a cooling medium flow passage 62, which communicates with the cooling medium supply passage 40a and the cooling medium discharge passage 40b, is provided on the surface 14b of the separator 14. The cooling medium flow passage 62 includes first flow passage grooves 64a to 64e which communicate with the cooling medium supply passage 40a, second flow passage grooves 66a to 66j each two of which are branched from each of the first flow passage grooves 64a to 64e respectively and which extend in the horizontal direction (direction of the arrow B), and third flow passage grooves 68a to 68e into each of which each two of the second flow passage grooves 66a to 66j are merged and-which communicate with the cooling medium discharge passage 40b.

Grooves 70a, 70b are formed on the surface 14b closely to the cooling medium supply passage 40a and the cooling medium discharge passage 40b respectively. Lid members 72a, 72b are arranged for the grooves 70a, 70b. The lid members 72a, 72b are provided with curved surfaces (not shown) which are similar to the curved surfaces 60a, 60b provided on the lid members 58a, 58b of the second separator 16. The second separator 16 is provided with curved surfaces (not shown) which are integral to the unillustrated curved surfaces described above, corresponding to entrance portions of the cooling medium supply passage 40a and the cooling medium discharge passage 40b. A step section 74, which surrounds the cooling medium flow passage 62, is formed on the surface 14b of the first separator 14. The seal member 33 is installed to the step section 74.

The operation of the fuel cell stack 10 according to the first embodiment constructed as described above will be explained below.

The fuel gas (for example, hydrogen-containing gas obtained by reforming hydrocarbon) is supplied to the inside of the fuel cell stack 10, and the air (or gas containing oxygen) as the oxygen-containing gas is supplied thereto. The fuel gas is introduced from the fuel gas supply passage 36a into the fuel gas flow passage 42 of each of the first separators 14. As shown in FIG. 3, the fuel gas, which is supplied to the fuel gas flow passage 42, is introduced into the gas flow passage grooves 44a to 44d, and it is moved in the direction of the gravity while meandering in the direction of the arrow B on the surface 14a of the first separator 14. During this process, the hydrogen gas in the fuel gas passes through the first gas diffusion layer 24, and it is supplied to the anode electrode 20 of the fuel cell unit 12. The fuel gas, which is not used, is discharged to the fuel gas discharge passage 36b.

Figure 6:
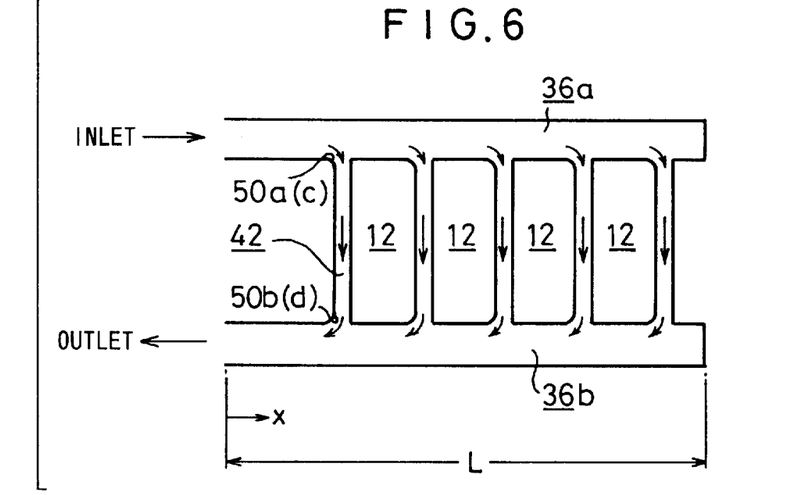
FIG. 6 illustrates the fuel cell stack as divided into fuel cell units and flow passages.

In the first embodiment, as shown in FIG. 2, the curved surfaces 50a, 50b, which are curved along the flow direction of the fuel gas, are provided on the surface 14a of the first separator 14. As shown in FIG. 6, the fuel cell stack 10 may be schematically expressed by the fuel cell units 12 and the fuel gas flow passage 42. When the fuel gas is introduced from the fuel gas supply passage 36a into the fuel gas flow passage 42 branched for each of the fuel cell units 12, then the fuel gas is smoothly apportioned in accordance with the guiding action of the curved surface 50a, and the delivery pressure loss is effectively reduced as compared with the conventional structure in which the branch portion makes the intersection at the right angle. On the other hand, the curved surface 50b is provided corresponding to the portion at which the fuel gas is introduced from the fuel gas flow passage 42 into the fuel gas discharge passage 36b. Therefore, the collection pressure loss is effectively reduced when the fuel gas is collected from the fuel gas flow passage 42 to the fuel gas discharge passage 36b.

Figure 7:
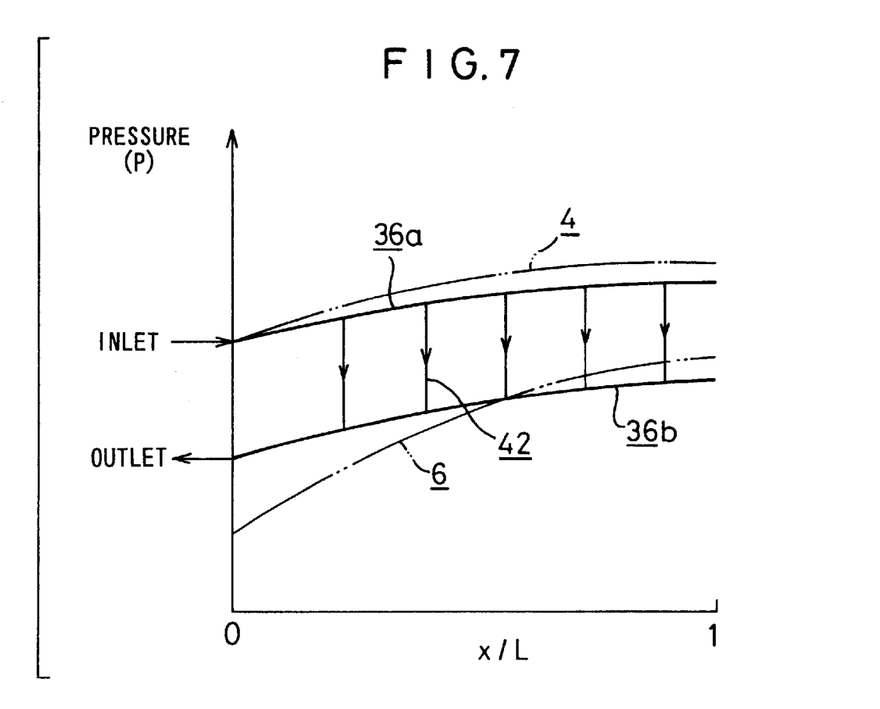
FIG. 7 illustrates the pressure distribution in the flow passages shown in FIG. 6.

Accordingly, the following effect is obtained. That is, the pressure loss in the fuel gas flow passage is greatly reduced. The fuel gas can be supplied to each of the fuel cell units 12 uniformly and reliably. It is possible to effectively improve the power generation performance and the power generation efficiency of the fuel cell stack 10. FIG. 7 shows the change of the pressure in the fuel cell stack 10. A result is obtained such that the pressure loss is greatly decreased as compared with the illustrative conventional technique as indicated by a two-dot chain line.

Further, the curved surfaces 50c, 50d, which are continuous to the curved surfaces 50a, 50b, are provided on the surface 16b of the second separator 16 (see FIG. 2).

Accordingly, even when the first separator 14 and the second separator 16 are formed to be considerably thin-walled in thickness, it is possible to reliably form the desired curved configuration. Thus, it is possible to reliably achieve the reduction of the delivery pressure loss and the collection pressure loss.

As shown in FIG. 4, the curved surfaces 60a to 60d are provided corresponding to the communication portions between the oxygen-containing gas flow passage 52 and the oxygen-containing gas supply passage 38a and the oxygen-containing gas discharge passage 38b. Accordingly, it is possible to easily reduce the delivery pressure loss and the collection pressure loss generated when the oxygen-containing gas is supplied in a branched manner from the oxygen-containing gas supply passage 38a to the oxygen-containing gas flow passage 52 corresponding to each of the fuel cell units 12 and then the residual oxygen-containing gas is collected in the oxygen-containing gas discharge passage 38b. Therefore, this arrangement is advantageous in that the oxygen-containing gas is supplied to each of the fuel cell units 12 uniformly and reliably.

Further, the unillustrated curved surfaces are similarly formed at the communication portions between the cooling medium flow passage 62 and the cooling medium supply passage 40a and the cooling medium discharge passage 40b. Accordingly, the cooling medium can be uniformly supplied to each of the fuel cell units 12. It is possible to easily improve the cooling efficiency.

Figure 8:
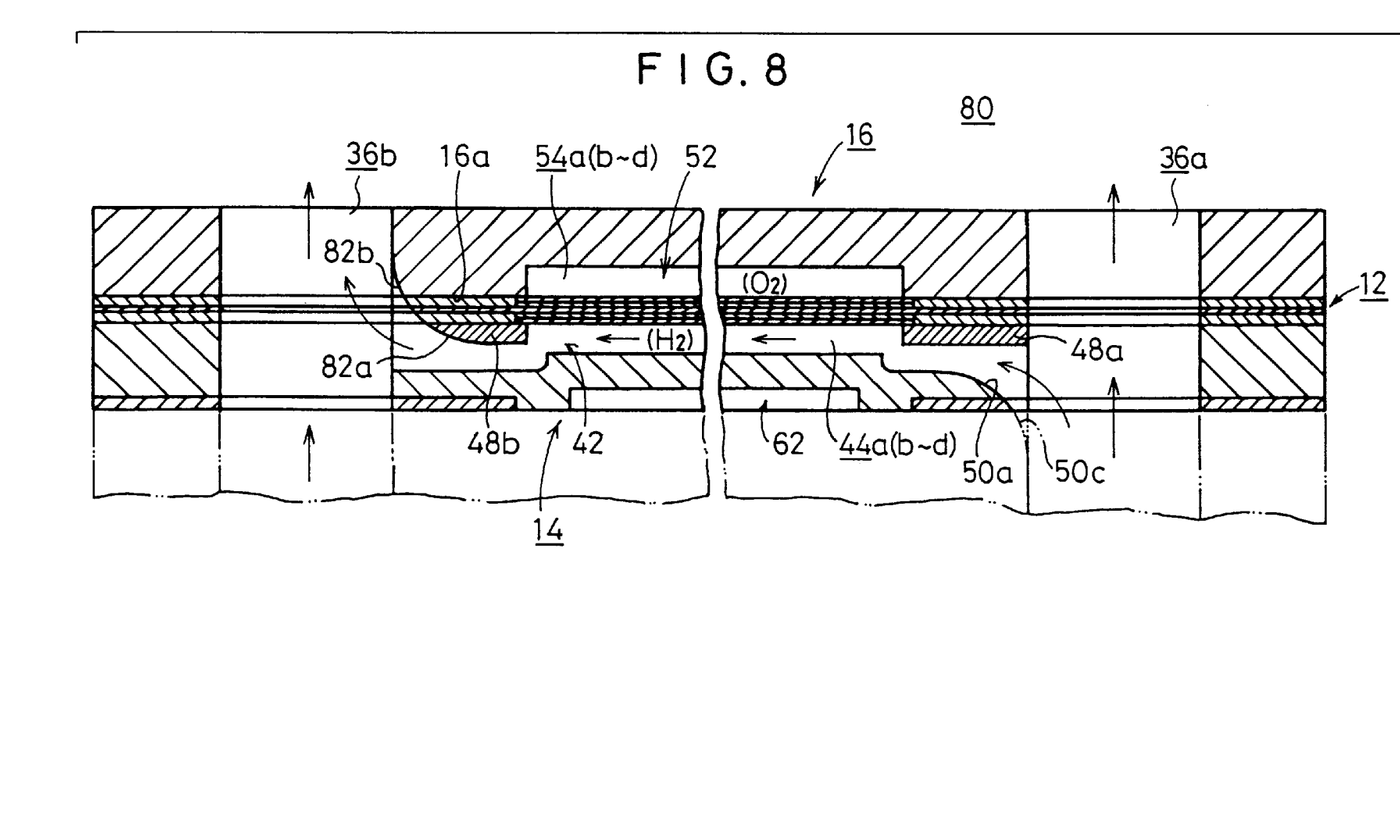
FIG. 8 illustrates a sectional view as obtained by cutting, along the flow passage of the fuel gas, a fuel cell stack according to a second embodiment of the present invention.

FIG. 8 shows a sectional view illustrating major components of a fuel cell stack 80 according to a second embodiment of the present invention corresponding to FIG. 2. The same constitutive components as those of the fuel cell stack 10 according to the first embodiment are designated by the same reference numerals, detailed explanation of which will be omitted.

The fuel cell stack 10 adopts the counter flow type structure of the flow passage in which the inlet and the outlet for the fluid are provided on the identical end side. On the other hand, the fuel cell stack 80 adopts the parallel flow type structure of the flow passage in which the inlet and the outlet for the fluid are provided on opposit end sides respectively. In the fuel cell stack 80, the fuel gas flows in the same direction through the fuel gas flow passage 36a and the fuel gas discharge passage 36b. A lid member 48b is formed with a curved surface 82a which is curved along the flow direction from the fuel gas flow passage 42 to the fuel gas discharge passage 36b. A curved surface 82b, which is continuous to the curved surface 82a, is formed on the surface 16a of the second separator 16.

Figure 9:
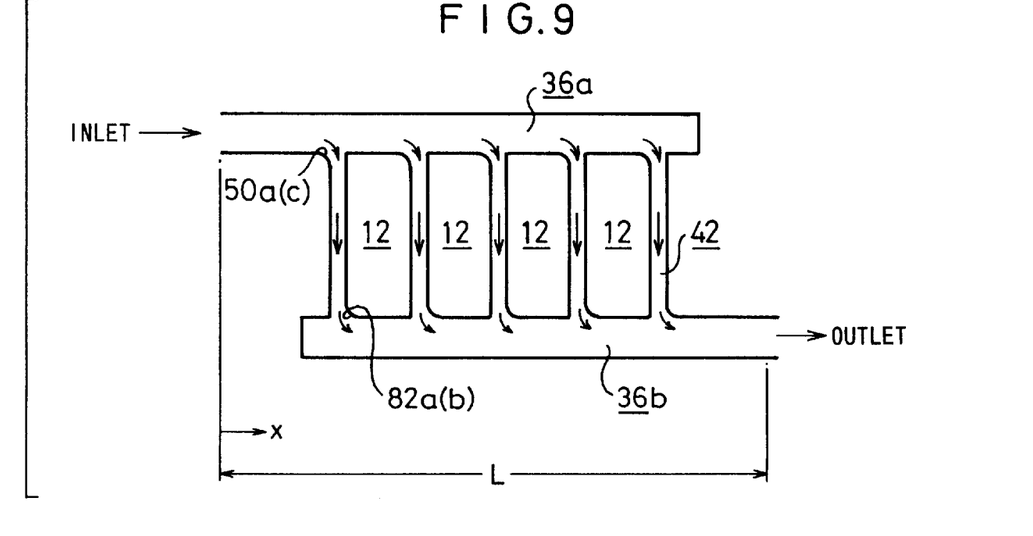
FIG. 9 illustrates the fuel cell stack as divided into fuel cell units and flow passages for the fuel gas.

As shown in FIG. 9, the fuel cell stack 80 may be expressed by the fuel cell units 12 and the fuel gas flow passage 42. The curved surfaces 50a, 50c are provided corresponding to the portions of introduction from the fuel gas supply passage 36a into the fuel gas flow passage 42. On the other hand, the curved surfaces 82a, 82b are provided corresponding to the portions of introduction from the fuel gas flow passage 42 into the fuel gas discharge passage 36b.

Figure 10:
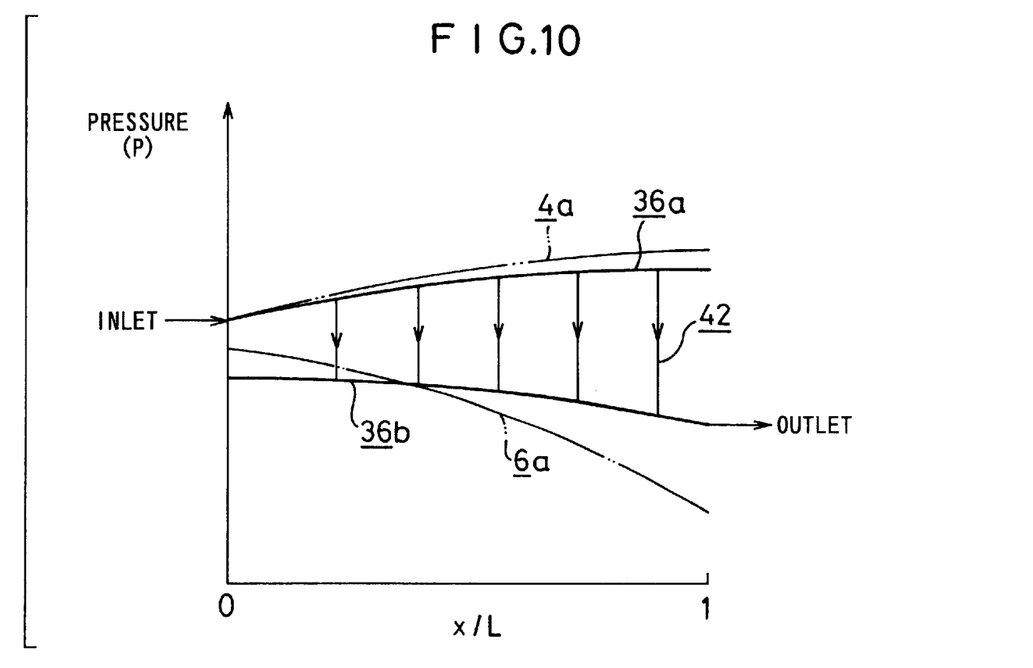
FIG. 10 illustrates the pressure distribution in the flow passages shown in FIG. 9.

Therefore, it is possible to obtain the same effect as that of the first embodiment. That is, for example, it is possible to effectively reduce the delivery pressure loss generated when the fuel gas is introduced from the fuel gas supply passage 36a into each of the fuel gas flow passages 42, and the collection pressure loss generated when the fuel gas is merged from the fuel gas flow passage 42 to the fuel gas discharge passage 36b. Further, the following effect is obtained. That is, as shown in FIG. 10, the change of the pressure loss of the fuel cell stack 80 is greatly reduced as compared with the conventional technique.

Figure 11:
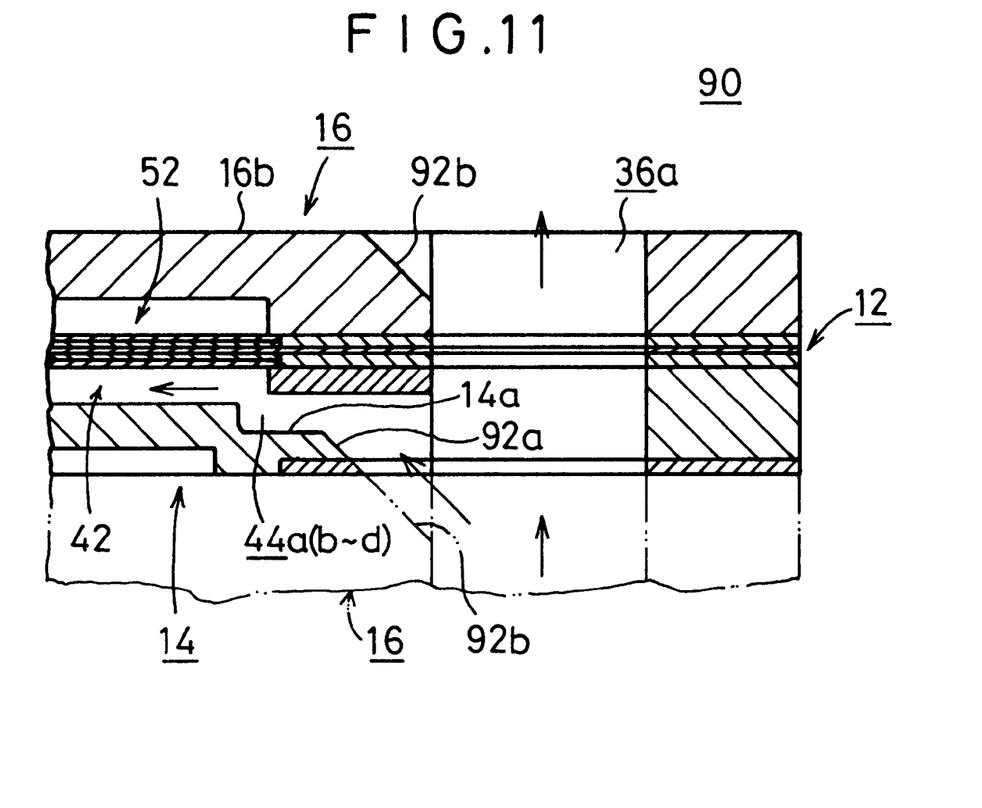
FIG. 11 illustrates a sectional view as obtained by cutting, along the flow passage of the fuel gas, a fuel cell stack according to a third embodiment of the present invention.

FIG. 11 shows a partial sectional view illustrating a fuel cell stack 90 according to a third embodiment of the present invention. The same constitutive components as those of the fuel cell stack 10 according to the first embodiment are designated by the same reference numerals, detailed explanation of which will be omitted.

The fuel cell stack 90 is provided with guide sections, for example, chamfered sections 92a, 92b which are bent corresponding to the communication portions with the fuel gas supply passage 36a and the fuel gas flow passage 42 respectively. The chamfered section 92a is provided on the surface 14a of the first separator 14, while the chamfered section 92b is provided on the surface 16b of the second separator 16.

Accordingly, in the third embodiment, the fuel gas, which is introduced from the fuel gas supply passage 36a into the fuel gas flow passage 42, is introduced into the fuel gas flow passage 42 smoothly and reliably in accordance with the guiding action of the chamfered sections 92a, 92b. Therefore, the same effect as that obtained in the first and second embodiments is obtained. That is, for example, it is possible to easily reduce the pressure loss and it is possible to improve the power generation performance and the power generation efficiency of the entire fuel cell stack 90.

In the third embodiment, the chamfered sections 92a, 92b are provided between the fuel gas supply passage 36a and the fuel gas flow passage 42. It is also preferable that the chamfered section or the curved surface is provided at the boundary portion between the fuel gas flow passage 42 and the fuel gas discharge passage 36b. Although explanation has been made for only the fuel gas flow passage 42 in the second and third embodiments, it is a matter of course that the same structure may be adopted for the oxygen-containing gas flow passage 52 and the cooling medium flow passage 62. It is also preferable that the curved or bent guide section is provided at the boundary portion between the fluid supply passage and the fluid flow passage and/or the boundary portion between the fluid flow passage and the fluid discharge passage. Various shapes may be selected therefor.

In the fuel cell stack according to the present invention, the separator is provided with the guide section which is curved or bent in the flow direction of the fluid, corresponding to the portion of introduction from the fluid communication passage into the flow passage in the surface of the separator and/or the portion of introduction from the flow passage into the fluid communication passage, for introducing the fluid including at least any one of the fuel gas, the oxygen-containing gas, and the cooling medium. It is possible to effectively reduce the delivery pressure loss and/or the collection pressure loss of the fluid. Accordingly, it is possible to supply the fluid to each of the fuel cell units uniformly and reliably. Thus, it is possible to effectively improve the power generation performance and the power generation efficiency of the fuel cell stack.

What is claimed is:

1. A fuel cell stack comprising a plurality of fuel cell units each including an anode electrode, a cathode electrode, and an electrolyte interposed between said anode electrode and said cathode electrode, said plurality of fuel cell units being stacked with a plurality of separators intervening therebetween, said fuel cell stack comprising:
a flow passage provided in each of said fuel cell units for supplying a fluid to said fuel cell units, said fluid including at least one of a fuel gas, an oxygen-containing gas, and a cooling medium;
a fluid communication passage provided in a stacking direction of said fuel cell units, said flow passage communicating with said fluid communication passage; and
a flow guide comprising a curved section disposed between said flow passage and said fluid communication passage for facilitating said fluid to flow from said flow passage into said fluid communication passage or to flow from said fluid communication passage into said flow passage.

2. A fuel cell stack comprising a plurality of fuel cell units each including an anode electrode, a cathode electrode, and an electrolyte interposed between said anode electrode and said cathode electrode, said plurality of fuel cell units being stacked with a plurality of separators intervening therebetween, said fuel cell stack comprising a flow passage formed in a surface of said separator, for supplying a fluid to said fuel cell units, said fluid including at least one of a fuel gas, an oxygen-containing gas, and a cooling medium;

a fluid communication passage provided to penetrate through said plurality of separators, said fluid communication passage communicating with said flow passage; and a flow guide comprising a curved section disposed between said flow passage and said fluid communication passage for facilitating said fluid to flow from said flow passage into said fluid communication passage or to flow from said fluid communication passage into said flow passage.

3. The fuel cell stack according to claim 2, wherein:

said separator includes a groove that is shallower than said flow passage; and a lid member is arranged for said groove, and said flow guide section is formed on a flow passage wall surface opposed to said lid member.

4. The fuel cell stack according to claim 2, wherein:

said separator includes a groove that is shallower than said flow passage; and a lid member is arranged for said groove, and said flow guide section is formed on a surface on a side of said flow passage of said lid member.

5. The fuel cell stack according to claim 2, wherein said flow guide section is provided continuously over two or more of said separators arranged with said fuel cell unit interposed therebetween.

6. A fuel cell stack comprising a plurality of fuel cell units each including an anode electrode, a cathode electrode, and an electrolyte interposed between said anode electrode and said cathode electrode, said plurality of fuel cell units being stacked with a plurality of separators intervening therebetween, said fuel cell stack comprising:

a flow passage provided in each of said fuel cell units for supplying a fluid to said fuel cell units, said fluid including at least one of a fuel gas, an oxygen-containing gas, and a cooling medium;

a fluid communication passage provided to penetrate through said plurality of separators, said fluid communication passage communicating with said flow passage; and a flow guide comprising a curved section disposed between said flow passage and said fluid communication passage for facilitating said fluid to flow from said flow passage into said fluid communication passage or to flow from said fluid communication passage into said flow passage.

7. The fuel cell stack according to claim 6, wherein:

said separator includes a groove that is shallower than said flow passage; and a lid member is arranged for said groove, and said flow guide section is formed on a flow passage wall surface opposed to said lid member.

8. The fuel cell stack according to claim 6, wherein:

said separator includes a groove that is shallower than said flow passage; and a lid member is arranged for said groove, and said flow guide section is formed on a surface on a side of said flow passage of said lid member.

9. The fuel cell stack according to claim 6, wherein said flow guide section is provided continuously over two or more of said separators arranged with said fuel cell unit interposed therebetween.

* * * * *